(12) United States Patent
Jayasuriya

(10) Patent No.: US 8,280,807 B2
(45) Date of Patent: Oct. 2, 2012

(54) SYSTEM OF TRANSFERRING AND UTILISING REUSABLE CREDIT

(76) Inventor: Yasas Jayasuriya, East Burnwood (AU)

(*) Notice: Subject to any disclaimer, the term of this patent is extended or adjusted under 35 U.S.C. 154(b) by 441 days.

(21) Appl. No.: 12/526,632

(22) PCT Filed: Nov. 9, 2007

(86) PCT No.: PCT/AU2007/001708
§ 371 (c)(1),
(2), (4) Date: Aug. 11, 2009

(87) PCT Pub. No.: WO2008/101273
PCT Pub. Date: Aug. 28, 2008

(65) Prior Publication Data
US 2010/0023411 A1    Jan. 28, 2010

(30) Foreign Application Priority Data
Feb. 23, 2007    (WO) ............... PCT/AU2007/000198

(51) Int. Cl.
*G06Q 40/00* (2012.01)
(52) U.S. Cl. ........................................... 705/39; 705/38

(58) Field of Classification Search ............ 705/38, 705/39
See application file for complete search history.

(56) References Cited

U.S. PATENT DOCUMENTS

| | | | | |
|---|---|---|---|---|
| 4,727,243 | A * | 2/1988 | Savar | 705/17 |
| 6,032,136 | A * | 2/2000 | Brake et al. | 705/41 |
| 7,752,134 | B2 * | 7/2010 | Spear | 705/41 |
| 2002/0107731 | A1 * | 8/2002 | Teng | 705/14 |

* cited by examiner

*Primary Examiner* — Jagdish Patel
(74) *Attorney, Agent, or Firm* — John F. Letchford; Archer & Greiner, P.C.

(57) ABSTRACT

The present Invention provides a system of transferring and utilizing reusable credit including a server having at least one database, at least one credit account having at least one line of credit, at least on© request for transfer, a reusable credit transfer processing (RCTP) system, a reusable credit accounting and transaction processing (RCATP) system and a reusable credit-merchant acceptance (RCMA) system whereby the system of transferring and utilizing reusable credit provides a means for enabling a sender to transfer reusable credit to a recipient for the purchase of goods/services and/or payment to another third party.

24 Claims, 5 Drawing Sheets

SYSTEM OF TRANSFERRING AND UTILISING REUSABLE CREDIT

FIELD OF THE INVENTION

The invention relates to financial transactions and accounts, and in particular, to a system of transferring and utilising 'reusable credit' which provides a means for enabling a credit card holder (the 'sender') to transfer reusable credit to another credit card holder (the 'recipient'), for the purchase of goods/services and/or payments to another third party.

For the purpose of the invention, it is to be understood that reusable credit can be defined as the credit that can be transferred from one unlinked credit card account to another in order to be reused by the recipient to purchase goods and services and/or forwarding payments to another third party.

Whilst the invention may be applied to any financial transaction using any type of financial account, for convenience sake, it shall be described herein in terms of a method and system of utilising reusable credit transferred between credit accounts for purchases or payments to third parties.

BACKGROUND TO THE INVENTION

Bank cards, and in particular, bank cards with credit facilities, are used extensively in every day trading. In the western world, many merchants offering goods and services have facilities for the acceptance of payment via either credit card or EFTPOS.

In the case of credit cards, the user is provided with an approved amount of credit by the credit provider, and is given a credit card, with which the user will be able to make purchases from merchants accepting that credit card.

At present, to receive a credit card payment, the recipient generally needs to have a merchant account. Entities who sell goods and services generally maintain merchant accounts. Through maintaining merchant accounts, merchants who sell goods and services can offer credit card holders the ability to make payments using their credit cards, without incurring high fees and charges. However, a merchant has to bear considerable costs to operate a merchant account. These costs are in the form of annual charges, transaction fees and merchant discounts; charged by the acquiring and card issuing banks. With such charges, small scale merchants will encounter difficulties to operate merchant accounts due to their small volume of transactions.

Currently, a credit card holder through the use of his/her credit card, can make payments to a third party who does not have a credit card payment acceptance system (merchant account) by (1) paying cash to the third party after obtaining the necessary funds through an automated teller machine (ATM) as a cash advance, (2) making a payment using credit card cheque or (3) transferring money electronically to a non-credit account (using Internet). However, all the above payment methods incur high interest, withdrawal fees and other transaction fees.

The proposed invention will offer an effective system that enables the transfer of available credit directly, from one credit card account to another unlinked third party credit card account; where the recipient will be able to receive credit card payment without maintaining a merchant account.

Accordingly, it is an object of the present invention to overcome or substantially ameliorate the disadvantages of the prior art by providing a system of transferring and utilising reusable credit which provides a means for enabling a sender to transfer reusable credit to a recipient for the purchase of goods/services and/or payment to another third party.

SUMMARY OF THE INVENTION

The present invention provides a system of transferring and utilising reusable credit including:
a server having at least one database;
at least one credit card/account having at least one line of credit including a standard line of credit and a reusable line of credit for receiving reusable credit from an unlinked credit account of at least one credit card/account holder and/or transferring/reusing the reusable credit to at least one second credit card/account holder;
at least one request for transfer;
a reusable credit transfer processing (RTCP) system;
a reusable credit accounting and transaction processing (RCATP) system; and
a reusable credit merchant acceptance (RCMA) system whereby the system of transferring and utilising reusable credit provides a means for enabling a sender to transfer reusable credit to a recipient for reuse for the purchase of goods/services and/or payment to another third party credit card/account holder.

The credit card/account(s) preferably has provided at least two lines of credit wherein each line of credit is separately accounted, but preferably remains linked to the same associated credit account. A first line of credit is preferably standard line of credit normally provided by a card account issuing bank/institution/body. A second line of credit is preferably 'reusable credit' which originates through transfer of available credit by third party credit card holders and once received are not owed to the bank and are not directly associated with the line of credit on the credit card.

The RCTP system is preferably adapted to transfer the reusable credit from one credit card account to another third party credit card account, preferably via at least one fund transfer facility. A first fund transfer facility is preferably in the form of an online transfer system having an interactive interface which is adapted to allow a payer to transfer funds, preferably reusable credit, from their credit card account to a payee's credit card account. It is preferred that the online transferring system has provided a software program which is adapted to provide an internet credit card access portal for the card issuing bank adapted to allow the transfer of reusable credit. A second fund transfer facility is preferably in the form of a call-centre facility which allows a user to transfer funds via a telecommunications means.

It is preferred that a user has provided a user ID and/or password which is used to access their account and/or the system.

The RCTP system preferably has provided at least one verification means wherein a first verification means is preferably an internal verification check designed to communicate with the credit card processing system and check the availability of available credit to approve the request and a second verification means is preferably an external verification check designed to verify the recipient credit account holder's details.

The RCATP system is preferably designed to receive transfer details from a bank/institution transferring reusable credit and maintain and manage separate individual accounts which only contain reusable credit balances. A first verification means of the RCATP system is adapted to determine whether there is an existing active reusable credit card account within the system matching beneficiary details stored on the database of the system once funds and a remittance advice is received.

It is preferred that the RCMA system includes an electronic fund transfer point of sale system (EFTPOS) or an internet credit card payment facility. The RCMA system preferably has provided a customised software program which is adapted to be installed onto credit-card payment facility platforms which includes an additional menu allowing a user to select between available credit options. The RCMA system preferably has provided an additional communications link which is designed to link the credit card processing system to the RCATP system.

In order that the invention may be more readily understood we will describe by way of non-limiting example of a specific embodiment thereof.

BRIEF DESCRIPTION OF THE DRAWING FIGURES

Figure 1:
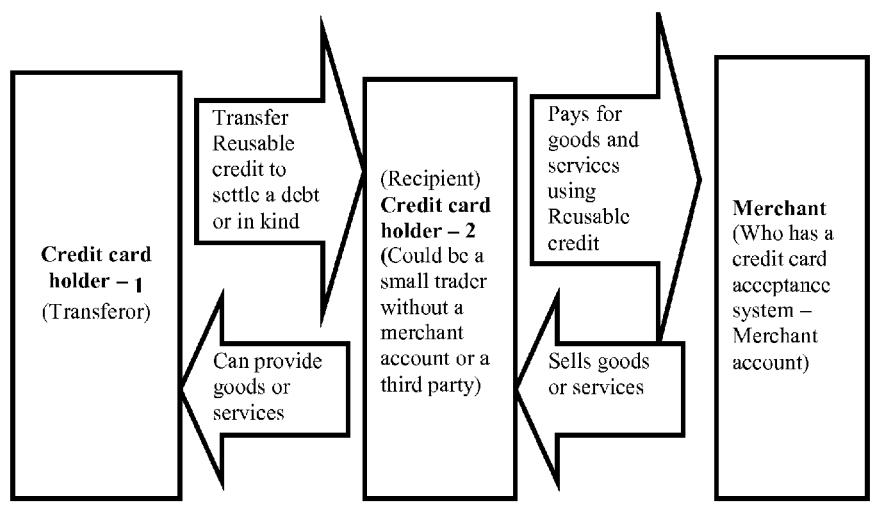
FIG. 1 shows a flowchart of the transfer of reusable credit between parties according to an embodiment of the invention.
Figure 2:
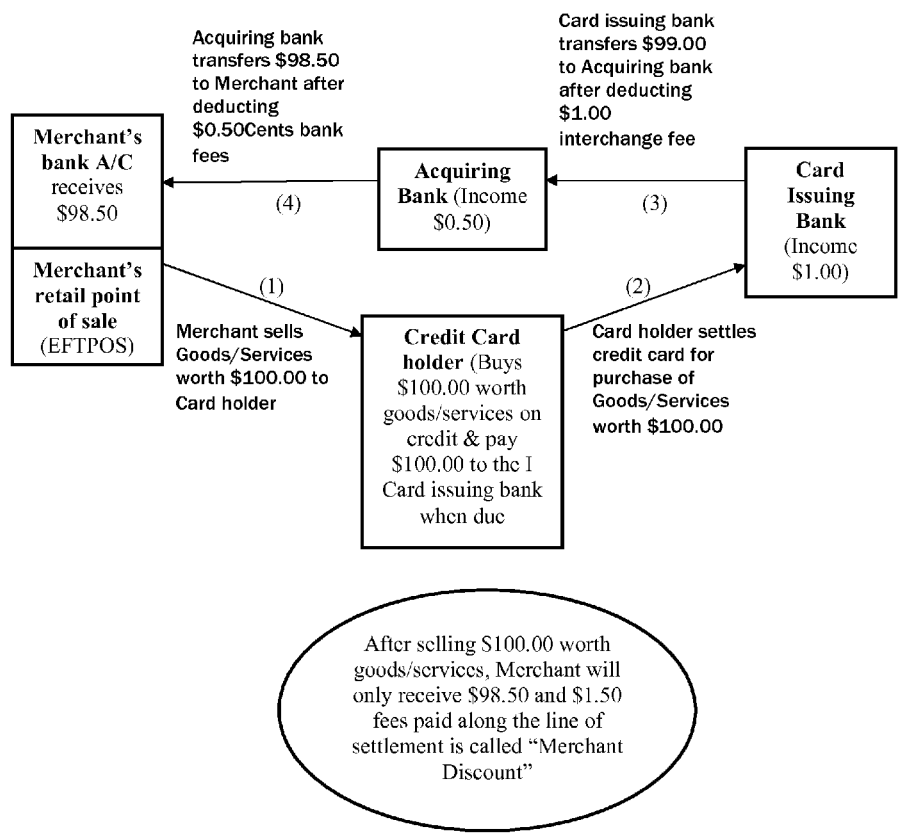
FIG. 2 shows a flowchart of the existing system for transferring credit between parties.
Figure 3:
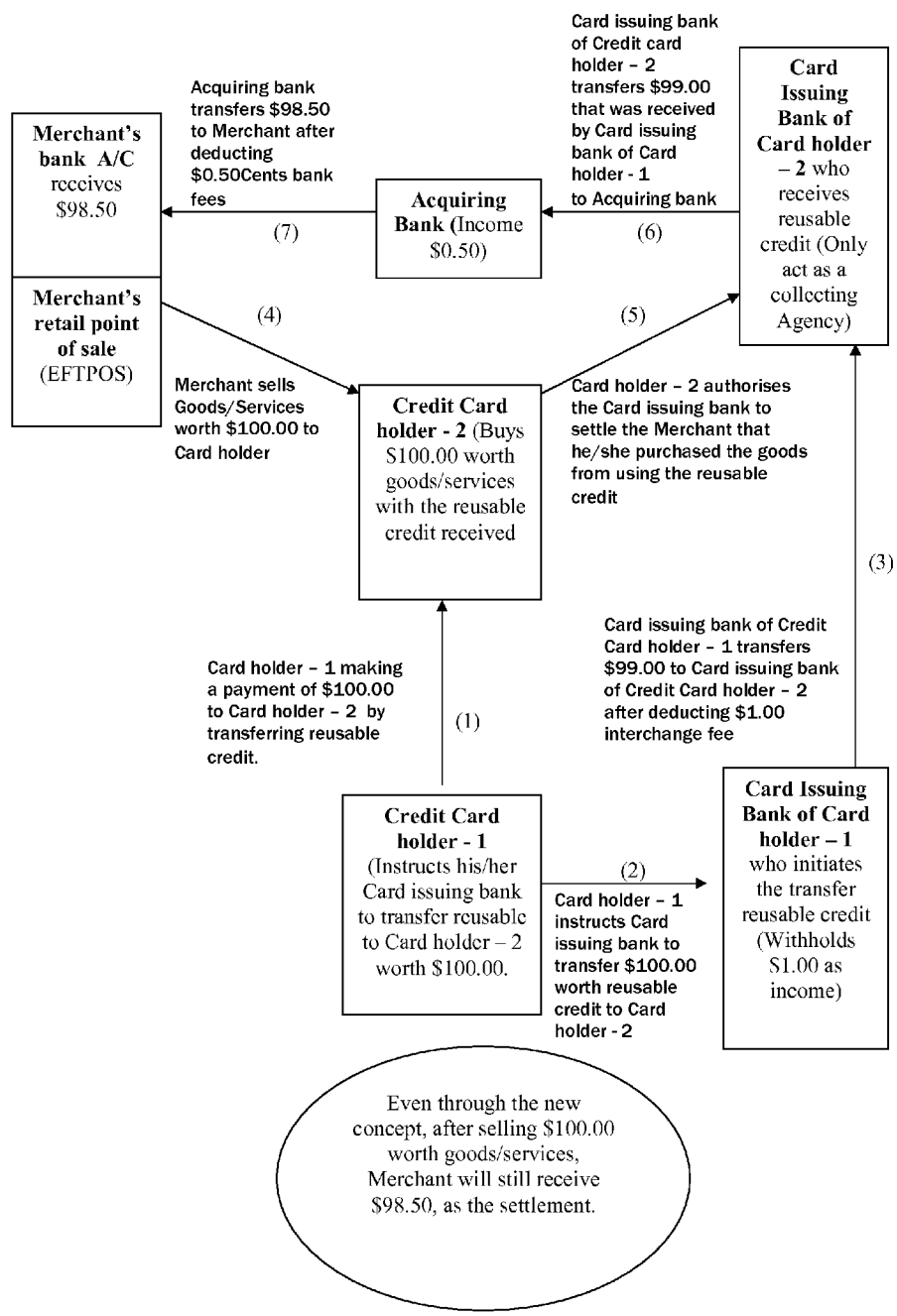
FIG. 3 shows an accounted diagrammatic example of the steps involved in the transfer and utilisation of reusable credit between parties according to an embodiment of the invention.
Figure 4:
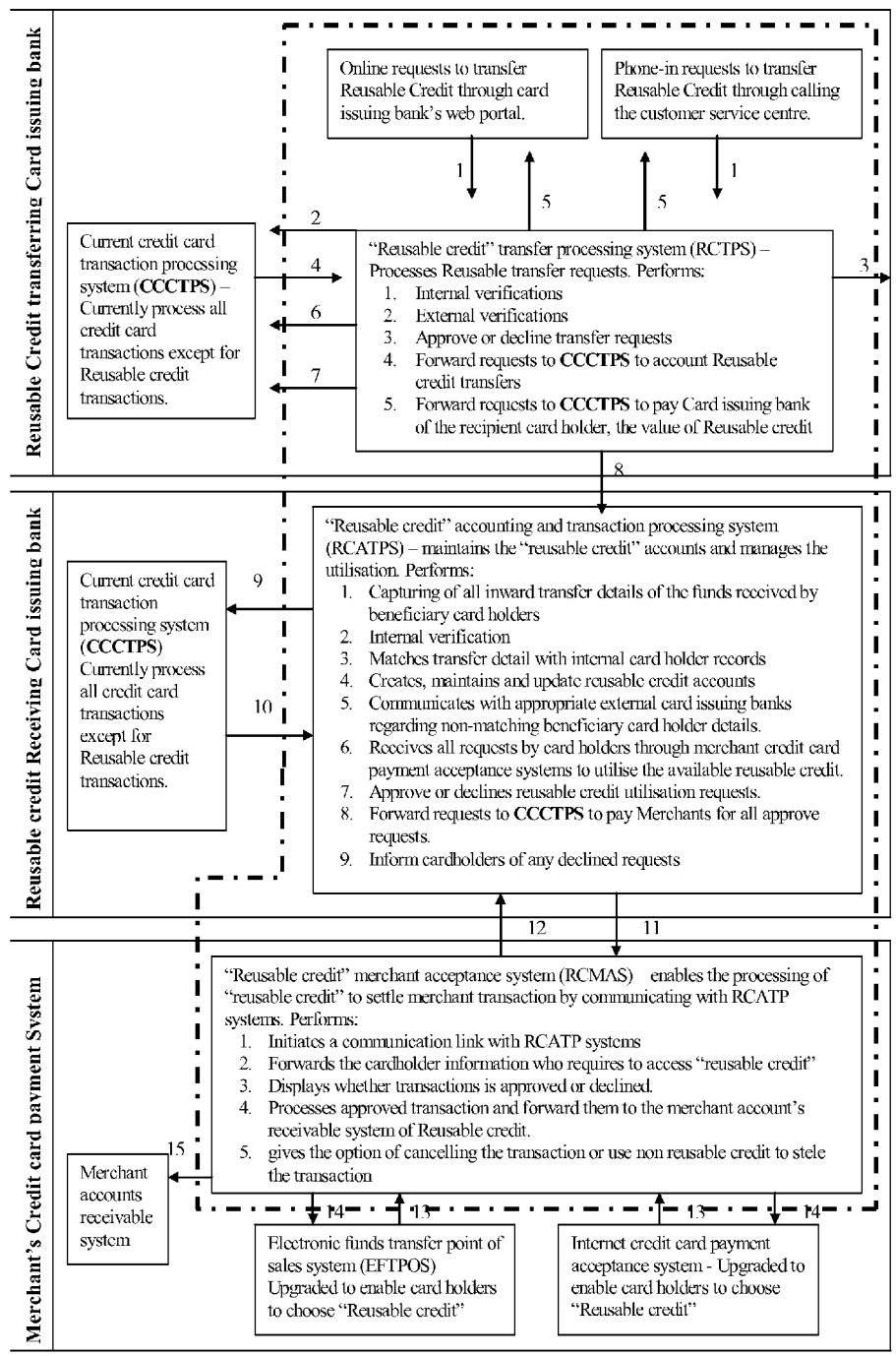

FIG. 4 use description of FIG. 3 which is diagram filed with PCT application.

Figure 5:
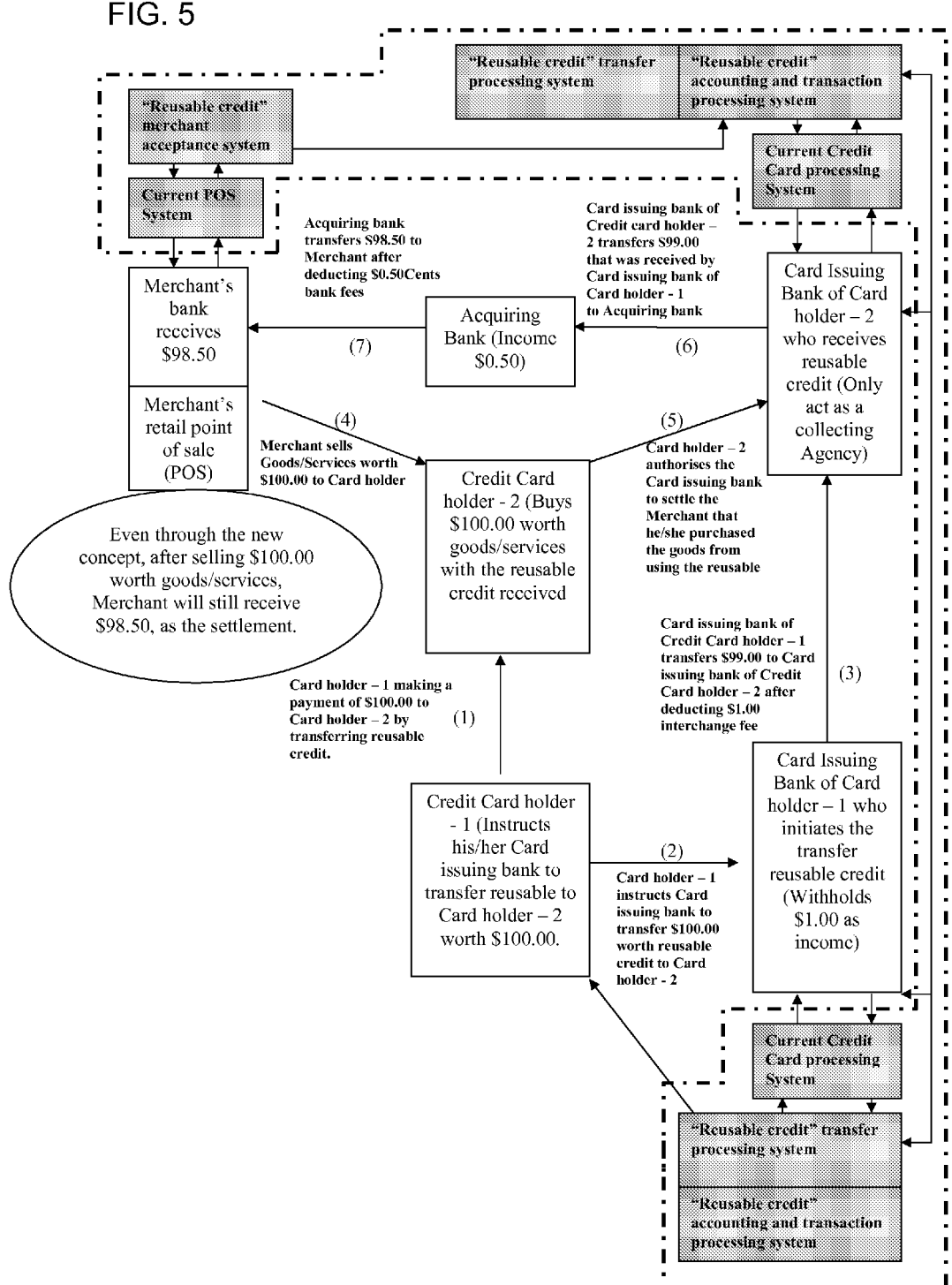

FIG. 5 shows the steps of transfer and utilisation of reusable credit and how RCTP, RCATP, RCMA systems facilitate the process.

DESCRIPTION OF A PREFERRED EMBODIMENT OF THE INVENTION

In this preferred embodiment, the invention provides a system of transferring and utilising reusable credit which provides a means for enabling a sender to transfer reusable credit to a recipient for the purchase of goods/services and/or payment to another third party. Overall, the system provides for the efficient and reliable transferring of 'reusable credit' from one party to another, via credit card accounts, without the need for a merchant account and with a reduction in the associated fees. The system of the invention is designed to operate in parallel with existing credit card processing systems in order to process 'reusable credit' transactions. It is envisaged that some existing system infrastructure may be used. However, the system defined by the invention will operate separately to transfer, receive and utilise reusable credit. It is envisaged that the features and functionality of the system may be varied as desired to suit the needs and/or requirements of different users (the payees and payers), financial providers and/or other applications.

By way of background, a merchant account allows a business to accept credit cards, debit cards (EFTPOS cards) and other forms of payment cards. This is also widely known as payment processing or credit card processing. Merchants, or business owners, who receive credit card payment for their goods or services, must apply for a merchant account typically through an appropriate financial institution.

The system preferably includes at least one request for transfer which is made by a sender/payer to transfer 'reusable credit' from their account to a recipient's reusable credit account. Thus, the 'reusable credit' functions differently to a cash advance. It is envisaged that the transfer amount will be subjected to bank fees by the transferring and acquiring banks for transferring and settling the account respectively. These fees will need to be considered by a sender when transferring a specific amount as the final amount received will be less than the amount specified for transfer. To date there are currently no systems which are designed to allow a user to transfer credit from a credit account or reusable credit account to another third party credit card account directly for the said third party to use for the purchase of goods or services or to transfer onward as credit to another third party.

Separate Accounts

Preferably, the system has provided at least two credit accounts. The credit accounts are preferably provided through financial institution such as a bank, loan lender or other suitable body. A first credit account preferably belongs to a sender and a second credit account preferably belongs to a recipient. It is envisaged that further credit accounts may be provided belonging to other senders and recipients in a continuous line of fund transfer.

The credit account(s) preferably has provided at least two lines of credit. It is preferred that each line of credit is separately accounted, but preferably remains linked to the same associated credit account. It is preferred that a first line of credit is preferably standard line of credit. The term standard credit is used to refer to the line of credit normally provided by a card account issuing bank/institution/body and is commonly applied to most credit cards. It is envisaged that the accounting process of the standard credit will the same as is currently used by the standard credit card processing system used when making payments on the credit account and/or conducting purchases or other transactions.

A second line of credit is preferably 'reusable credit'. The term 'reusable credit' is intended to refer to funds which are transferred between one credit card account to another. The funds are preferably funds which are not owed to the bank and are not directly associated with the standard line of credit on the credit card. The 'reusable credit' will preferably be accounted separately and will not be available for use to be set-off against any outstanding balances on a receipt's standard credit.

RCTP

The invention preferably has provided a 'reusable credit' transfer processing (RCTP) system. Preferably, the RCTP system is adapted to transfer the reusable credit from one credit card account to another third party credit card account, preferably via at least one fund transfer facility. The third party credit card account will usually be that of a recipient, typically a trader or merchant supplying goods and/or services, or any other suitable individual or business.

A first fund transfer facility is preferably in the form of an online transfer system. The online transfer system preferably has provided an interactive interface which is adapted to allow the payer to transfer funds, preferably 'reusable credit', from their credit card account to a payee's credit card account, preferably similar to the manner in which funds are commonly transferred online currently by bank websites. The interactive interface is preferably in the form of a website having at least one interactive web page, which is interconnected and/or interlinked and accessible via a link provided on the website, and is adapted to provide a user with access to the features and functionality of the system.

Preferably, the online transfer system has provided a software program. The software program is preferably adapted to provide an internet credit card access portal of the card issuing bank adapted to allow the transfer of reusable credit. The software program is preferably adapted to assist in managing and executing the functions associated with, and provided by, the system in transferring 'reusable credit'. The software program may preferably be adapted to be installed on a server. The server may preferably be the server of a service provider or a financial institution. The server preferably has provided at least one database which is adapted to store all the relevant data and information for the system.

Each user preferably has provided a user ID and/or password which is used to access their account and/or the system. The user ID and/or password is/are preferably issued to the user at the time of registration to use the system. Preferably, once logged into the system, the user will be provided with a new menu on the banking portal that preferably provides the option to transfer 'reusable credit'. Preferably, the user, for example the card holder, is then able to enter the required details for the transaction including, but not limited to, the amount of funds to be transferred, card issuing bank details, account number, card holder name and reference that relates to a particular transfer of reusable credit. Preferably, once the required details are completed the request is preferably submitted to be processed by pressing a submit button or the like on the screen for processing and transfer by the system.

It is envisaged that the online transfer system can be integrated with, and use existing elements of, the systems and software currently used by banks to provide their customers with internet banking facilities.

Call-Centre Facility

A second fund transfer facility is preferably in the form of a call-centre facility. It is envisaged that the call-centre facility may be provided by the card issuing bank, or alternatively, an independent third party. Preferably, the call-centre facility is adapted to allow a user to transfer funds from their credit card to a third party's credit card account preferably similar to the manner in which funds are commonly transferred via telephone currently using telephone banking methods. In this way, it is envisaged that transfers can be made when a payer does not have immediate access to the internet, but has access to a telephone.

The call-centre facility is preferably operated by customer service staff and/or by an automated facility. It is preferred that the customer service staff is/are trained to organise and coordinate credit transfers. Alternatively, an automated facility, in the form of an automated service adapted for use via telephone, may be utilised to receive incoming calls which can be subsequently processed and actioned. The automated facility may preferably be used in addition to, or instead of, the customer service staff. Preferably, the automated facility uses telephone touch keys, voice recognition, or both, to process incoming requests.

Preferably, the call-centre facility has provided a software program adapted to facilitate the transfer of reusable credit, whether via automated or staff-assisted means. Preferably, payees can effect transfers by contacting the customer service staff and/or the by using the automated facility. Credit card holders may preferably call the call-centre facility where customer service staff preferably assist in ensuring that the requested transfers are processed. Each user preferably has provided a user ID and/or password which is used to access their account and/or the system. The user ID and/or password is/are preferably issued to the user at the time of registration to use the system. Preferably, once the call-centre facility verifies the security details provided, the customer service staff or the automated facility can utilise the software program to process the request to transfer reusable credit. Preferably, the customer service staff and/or the payer are able to enter the required details for the transfer, including the amount of funds to be transferred, card issuing bank details, account number, card holder name and reference that relates to a particular transfer of reusable credit, and submit transactions for processing.

Verification Process

The RCTP system preferably has provided at least one verification means. A first verification means is preferably an internal verification check. The internal verification means is preferably designed to communicate with the credit card processing system and check the availability of available credit to approve the request. If there is no available credit, a negative notification will be sent through the internet credit card access portal or customer service staff software to indicate the non-availability of credit to perform the transaction. If there is available credit a positive notification will be sent to indicate the transaction has been accepted.

A second verification means is preferably an external verification check. The external verification means is preferably designed to verify the recipient credit account holder's details. If the external verification fails, a negative notification will be sent to the payer and the transaction will be cancelled. Preferably, if the external verification is successful then a message of success will preferably be sent to the relevant processing system to account the transaction. The system will preferably simultaneously send details of the request for transfer to an accounts payable division to transfer the funds to the recipient and send a remittance advice for the transfer of funds.

RCATPS

The invention preferably has provided a 'reusable credit' accounting and transaction processing system (RCATPS). The RCATP system is preferably designed to receive transfer details from a bank/institution, transferring 'reusable credit' and maintain and manage separate individual accounts which only contain 'reusable credit' balances. The RCATP system preferably has at least one verification means. A first verification means is adapted to determine whether there is an existing active reusable credit card account within the system matching beneficiary details stored on a database of the system once funds and a remittance advice is received. Once the beneficiary details are verified, then the RCATP system will preferably add the newly received funds to that particular account. Preferably, if the payee does not have an existing reusable credit card account, then the RCATP system will verify whether there is a match with the recipient's details, preferably using the current credit card process system currently in widespread use. Preferably, if a valid account exists in the current credit card process system, the RCATP preferably indicates that the card holder is receiving reusable credit for the first time, and the RCATP system will preferably then activate a new account that will be created using the retrieved beneficiary details, to account for the newly received reusable credit. Preferably, the new account will be created through obtaining the beneficiary data from current credit card processing system, and preferably, once the account has been created then the received credit will be recorded in the account.

If there are no matching details found in either RCATP system nor in the current credit card processing system, the newly received 'reusable credit' cannot be accounted as there is no matching credit card account for a nominated beneficiary. In such instances the RCATP system will send a negative notification to the sender informing that there is no match to receive the 'reusable credit' and the transaction will be declined.

The RCATP system is preferably adapted to be linked to a 'reusable credit' merchant acceptance system, such as the electronic fund transfer point of sale system (EFTPOS) or an internet credit card payment facility. At the time of processing and/or purchase, a request to access 'reusable credit' is sent from the credit card processing system to the RCATP system. The RCATP system will then check the availability of 'reusable credit' within a specified account from a list of reusable credit accounts within the database and approve or deny the transaction.

RCMAS

The invention preferably has provided a 'reusable credit' merchant acceptance system (RCMAS). The RCMA system is preferably designed to allow a user to access their 'reusable credit' and process any requests so that a person can pay for the purchase of goods and services or merchant transaction. Currently, credit card payment acceptance systems, such as EFTPOS or those using the internet, do not have the ability to access reusable credit balances maintained by the RCATP system. Preferably, the system has provided software and hardware components adapted to allow current credit card payment acceptance system to utilise the invention. It is envisaged that the RCMA system may preferably be integrated into, and utilise elements of, currently used payment systems. Preferably, said software and hardware will provide credit card holders with the option of payment by, preferably, (1) credit allocated to the credit card by the card issuing bank, or preferably (2) the transferred reusable credit via the RCTP system. Therefore, it is envisaged that both types of credit can be accessed through the payer's and/or payee's own credit card. The RCMA system preferably has provided an additional communications link which is designed to link the credit card processing system to the RCATP system.

The RCMA system of the invention is preferably adapted to have provided a customised software program which is adapted to be installed onto credit-card payment facility platforms. The customised software may be adapted to replace existing software or be installed as a plug-in or upgrade for existing systems. The customised software is preferably adapted to allow EFTPOS machines to preferably include an additional menu to be shown on the screen, preferably when a payer or payee selects the "credit" payment option. Preferably, the additional menu provides the option for the payer to settle the account by preferably using either (1) credit allocated to the credit card by the card issuing bank, or preferably (2) the transfer of reusable credit via the RCTP system. When option (1) is selected the credit card payment system preferably will initiate the transaction using the standard existing credit card processing system, and if option (2) is selected the credit card payment system will preferably initiate the transaction using the RCMA and RCATP systems. The customised software program may also be integrated with internet payment facility platforms, such that payments screens will provide the additional option for using reusable credit for payment when a credit account is selected and/or when a user enters their credit account details.

Accounting

It is preferably provided that the reusable credit received by the payee's bank will be accounted for preferably in a separate account. Preferably, the payee's bank will receive all transfer details from the payer's bank transferring the 'reusable credit'. The RCATP system preferably maintains a set of separate individual accounts adapted to preferably only contain reusable credit balances.

Preferably, the accounting system will reduce the available credit balance when the payee requests to utilise such balance, for example to settle merchant transactions. Preferably, the increases in the available reusable credit transferred from a payer will be recorded only when RCATP system receives transfers of reusable credit from other credit card holders. Preferably, a single credit card account will then have two separate sub-accounts, the first being that of the standard credit allocated to the credit card by the card issuing bank, and the second being the reusable credit amounts transferred from other credit card holders. Preferably, the transactions of each category will be shown separately based on the category that they fall under. Each category preferably has an opening balance and a closing balance separately shown.

In a preferred embodiment, the 'reusable credit' account will be subject to the general credit card terms of the standard credit account provided on the card. Once a transfer has been completed, the payer will be debited with the transferred amount on the approved date. It is preferred that these transactions will not attract interest charges form the time of transaction but rather, the transactions will be reflected in the credit card account and will fall due based on the credit terms applicably for the credit card.

Accordingly, interest charges can be eliminated by using the proposed invention if the card holders pay their balances in full when they fall due. It is further envisaged that the recipient will be able to use the 'reusable credit' as a cash advance in addition to, or instead of using the received credit to purchase goods and services.

The 'reusable credit' transfer system is adapted to be tailored to the needs of a user and future embodiments may incorporate additional features to achieve this. While we have described herein a particular embodiment of a 'reusable credit' transfer system, it is further envisaged that other embodiments of the invention could exhibit any number and combination of any one of the features previously described. However, it is to be understood that any variations and modifications can be made without departing from the spirit and scope thereof.

I claim:

1. A computer system for transferring and utilising reusable credit including:
   a computer network configured to store in memory a plurality of credit cards/accounts with at least one credit card account having at least two lines of credit including a standard line of credit and a reusable line of credit;
      wherein the standard line of credit is issued by an issuing entity linked to a credit account of at least one party's credit card/account, and
      the reusable line of credit for receiving reusable credit from an unlinked credit account of at least one other party's credit card/account;
   a computer network configured for reusable credit transfer processing (RTCP) system wherein upon request the RCTP system is adapted to transfer at least part of the available credit from one credit card account of the other party's credit card account to the at least one party's credit card account, via at least one communication network;
   a computer network configured for reusable credit accounting and transaction processing (RCATP) system wherein the RCATP system is designed to receive transfer details from a bank/institution transferring the reusable line of credit and maintain and manage separate individual accounts which contain reusable credit balances; and a computer network configured for reusable credit merchant acceptance (RCMA) wherein the RCMA system is designed to receive and use transferred reusable line of credit from the reusable credit balances and separately or in combination with using credit from the credit account from the standard line of credit;

whereby the transferring and utilising reusable credit provides a means for enabling the at least one other party to be a sender to transfer reusable line of credit to the at least one party to be a recipient for use for the purchase of goods/services and/or payment from the at least one other party credit card/account holder.

2. A system of transferring and utilising reusable credit as claimed in claim 1 wherein the credit card/account(s) has provided at least two lines of credit.

3. A system of transferring and utilising reusable credit as claimed in claim 2 wherein each line of credit is separately accounted, but remains linked to the same associated credit account and allows the sender of the reusable credit to handle their one credit card/account separate to the recipient's one credit card/account including repaying the transferred credit regardless of usage of the credit by the recipient.

4. A system of transferring and utilising reusable credit as claimed in claim 2 wherein a first line of credit is standard line of credit normally provided by a card account issuing bank/institution/body.

5. A system of transferring and utilising reusable credit as claimed in claim 2 wherein a second line of credit is 'reusable credit' which can be transferred between users including funds which are not owed to the bank and are not directly associated with the standard line of credit on the credit card.

6. A system of transferring and utilising reusable credit as claimed in claim 1 wherein the RCTP system is adapted to transfer the reusable credit from one credit card account to another third party credit card account, preferably via at least one fund transfer facility.

7. A system of transferring and utilising reusable credit as claimed in claim 6 wherein a first fund transfer facility is in the form of an online transfer system having an interactive interface which is adapted to allow a payer to transfer funds, preferably 'reusable credit', from their credit card account to a payee's credit card account.

8. A system of transferring and utilising reusable credit as claimed in claim 7 wherein the interactive interface is in the form of a website having at least one interactive web page.

9. A system of transferring and utilising reusable credit as claimed in claim 7 wherein the online transferring system has provided a software program which is adapted to provide an internet credit card access portal of the card issuing bank adapted to allow the transfer of reusable credit.

10. A system of transferring and utilising reusable credit as claimed in claim 6 wherein a second fund transfer facility is in the form of a call-centre facility which allows a user to transfer funds via a telecommunications means.

11. A system of transferring and utilising reusable credit as claimed in claim 10 wherein the call centre facility has provided a software program which is adapted to enable the payee(s) to interact with the call centre staff/automated service to transfer reusable credit.

12. A system of transferring and utilising reusable credit as claimed in claim 1 wherein a user has provided a user ID and/or password which is used to access their account and/or the system.

13. A system of transferring and utilising reusable credit as claimed in claim 12 wherein the customised software program includes a menu allowing a user to select between available credit options.

14. A system of transferring and utilising reusable credit as claimed in claim 1 wherein the RCTP system has provided at least one verification means.

15. A system of transferring and utilising reusable credit as claimed in claim 14 wherein a first verification means is an internal verification check designed to communicate with the credit card processing system and check the availability of available credit to approve the request.

16. A system of transferring and utilising reusable credit as claimed in claim 15 wherein a second verification means is an external verification check designed to verify the recipient credit account holder's details.

17. A system of transferring and utilising reusable credit as claimed in claim 1 wherein the RCATP system is designed to receive transfer details from a bank/institution transferring 'reusable credit' and maintain and manage separate individual accounts which only contain 'reusable credit' balances.

18. A system of transferring and utilising reusable credit as claimed in claim 1 wherein the RCATP system has at least one verification means.

19. A system of transferring and utilising reusable credit as claimed in claim 18 wherein a first verification means is adapted to determine whether there is an existing active reusable credit card account within the system matching beneficiary details stored on the database of the system once funds and a remittance advice is received.

20. A system of transferring and utilising reusable credit as claimed in claim 1 wherein the RCMA system includes an electronic fund transfer point of sale system (EFTPOS) or an internet credit card payment facility.

21. A system of transferring and utilising reusable credit as claimed in claim 1 wherein the RCMA system has provided a customised software program which is adapted to be installed onto credit-card payment facility platforms.

22. A system of transferring and utilising reusable credit as claimed in claim 1 wherein the RCMA system has provided a communications link which is designed to link the credit card processing system to the RCATP system.

23. A system of transferring and utilising reusable credit as claimed in claim 1 wherein a credit card is provided for the credit account which can access the two lines of credit.

24. A System of transferring and utilising 'reusable credit' which provides a means for enabling a credit card holder (the 'sender') to transfer reusable credit to another credit card holder (the 'recipient'), wherein the system transfers 'reusable credit' from one unlinked credit card account to another in order to be reused by the recipient to purchase goods and services and/or forwarding payments to another third party and wherein the system includes:

a. at least one internet portal hosted in a server or a call centre facility, which are connected to at least one database that holds reusable credit transfer processing (RTCP) system, RCTP system upon request is adapted to transfer at least part of the available credit from one credit card account via at least one communication network that will connect with both credit card accounts of 'sender' and 'recipient';

b. at least one database that holds reusable credit accounting and transaction processing (RCATP), wherein the RCATP system is designed to receive transfer details generated by RCTP system via a bank/institution transferring 'reusable credit' with RCATP system also designed to maintain and manage separate individual accounts which contain 'reusable credit' balances and with RCATP system connected to at least one communication network that links with RCTP system to record receipts of reusable credit and also links to reusable credit merchant acceptance (RCMA) to record and approve reusable credit merchant transactions, said RCATP system enabling connection via at least one communication network to clearing house to reconcile receipts and payments of the physical reusable credit funds transfers;

c. at least one enhanced credit card merchant payment acceptance terminal that recognises the new hybrid credit card, which holds reusable credit with reusable credit merchant acceptance (RCMA) system that resides in the enhanced merchant terminals will recognise the hybrid credit card, which holds reusable credit and up on request, will establish connection via at least one communication network with the issuing entity and RCATP system to process transactions;

wherein said RCTP, RCATP and RCMA systems being operative in plurality and in multiple entities.

* * * * *